United States Patent
Hellum et al.

[19]

[11] Patent Number: 6,104,729
[45] Date of Patent: Aug. 15, 2000

[54] METHOD AND APPARATUS FOR SYNCHRONIZATION OF TIME STAMPING

[75] Inventors: Pål Hellum, Sandvika; Kristin Aksnes, Asker, both of Norway

[73] Assignee: Telefonaktiebolaget LM Ericsson, Stockholm, Sweden

[21] Appl. No.: 08/929,463

[22] Filed: Sep. 15, 1997

[30] Foreign Application Priority Data

Sep. 16, 1996 [SE] Sweden ................................. 9603368

[51] Int. Cl.$^7$ ................................................. H04J 3/06
[52] U.S. Cl. .......................... 370/503; 370/252; 370/350; 370/389
[58] Field of Search ...................... 370/503, 507, 370/350, 252, 352, 389; 375/356, 376

[56] References Cited

U.S. PATENT DOCUMENTS

| | | | |
|---|---|---|---|
| 5,245,634 | 9/1993 | Averbuch | 375/357 |
| 5,280,629 | 1/1994 | Lo Galbo et al. | 455/503 |
| 5,440,313 | 8/1995 | Osterdock et al. | 342/352 |
| 5,510,797 | 4/1996 | Abraham et al. | 342/352 |

FOREIGN PATENT DOCUMENTS

| | | |
|---|---|---|
| 0726664A2 | 8/1996 | European Pat. Off. . |
| 2 300 789 | 1/1996 | United Kingdom . |
| WO94/08405 | 4/1994 | WIPO . |
| WO95/05039 | 2/1995 | WIPO . |

*Primary Examiner*—Hassan Kizou
*Assistant Examiner*—Mitchell Slavitt
*Attorney, Agent, or Firm*—Burns, Doane, Swecker & Mathis, L.L.P.

[57] ABSTRACT

The present invention relates to an apparatus and a method for synchronization, of at least two time stamping clocks (213; 214; 310, 311) in a network, with high accuracy as well as a method for measuring transmitting delays of packets, with high accuracy. In more detail the present invention comprises a GPS- receiver (207; 307) which supplies TOD (Time of Day) and PPS (Pulse per second) to a synchronization function (209, 210; 308, 309). The synchronization function uses TOD to be able to calculate an absolute time for said time stamping clock. This arrangement allows for a synchronized absolute time between the time stamping clocks in the different nodes (101, 102; 201, 202; 301, 302) with a resolution of 1 second. The PPS pulse is used to synchronize the clocks with an accuracy of 1 microsecond. The time stamping clocks in the different nodes in the network is phase-locked to network-synchronization clocks (205; 305). By adjusting the frequency of the time stamping clocks a suitable resolution can be obtained within each second.

17 Claims, 4 Drawing Sheets

METHOD AND APPARATUS FOR SYNCHRONIZATION OF TIME STAMPING

FIELD OF INVENTION

The present invention relates to a method and to an arrangement for synchronizing a time stamping clock in a network with a high degree of accuracy, and to an arrangement for measuring packet transmission delays in a network with a high degree of accuracy.

BACKGROUND OF THE INVENTION

Delays occur in packet switched networks when switching a packet from one node in the network to another node. These delays can vary very significantly and, among other things, are due to the degree of utilization in the network and in individual nodes, and also to the policy of different nodes in forwarding a packet on arrival.

It is desirable to be able to measure the delays, so as to enable a network to be trimmed or to ascertain which part of the network are subjected to greater or smaller delays, for instance. Delays are measured by time stamping a packet, i.e. by storing in the packet a value which represents the time at which the packet leaves the node. The packet is then sent to another node in the network, and this node reads the stored value and compares the said value with the value on the time stamping clock in the own node, i.e. so-called two-time measuring. This provides a value of the delay. In order for this method to function satisfactorily, the time stamping clocks in the two nodes must show precisely the same absolute time, i.e. they must be synchronized.

In another delay measuring process, a one-time measuring process, the receiving node need not itself calculate the delay, and solely sends the packet immediately back to the original node. The value stored in the packet is read in the original node and compared with the current value of the time stamping clock. This obviates the need to synchronize two time stamping clocks, since only one time stamping clock is used. The measurement value obtained shows the delay in switching a packet to and fro. The delay in one direction is obtained by dividing the value by two. This results in a very good value, when delays are symmetrical. Unfortunately, this is not often the case, since the packet can travel to and fro along two different paths and in parts of the network that have significantly different nodes. This is particularly pronounced in the case of ATM networks (Asynchronous Transfer Mode).

Examples of one-time and two-time measuring processes are CTD (Cell Transfer Delay) and CDV (Cell Delay Variation).

In an ATM network, a performance management function (PM) divides a number of packets into a block. A PM packet follows each block and mediates different property related magnitudes, which include the value of the time stamping clock of the source node. This value is used in the target node to measure delays. If a combination of a fast link, e.g. 622 MB/s, and a small block size, e.g. 128 packets, is used, this will result in a large number of PM packets to the target node. This places great demands on the process capacity of the target node. The number of connections may also contribute towards the requirement of processor capacity.

Synchronization of time stamping clocks is a well-known problem in this field. NTP (Network Time Protocol) used to synchronize time stamping on the Internet can be quoted as an example in this respect. NTP has an accuracy of about one millisecond and is thus inadequate for ATM, for instance.

It is known from U.S. Pat. No. 5,280,629, Technique for Measuring Channel Delay, to use GPS equipment (Global Positioning System) to synchronize time stamping clocks for the purpose of measuring time delays between two nodes in a network.

One problem with the use of GPS for synchronizing time stamping clocks in accordance with U.S. Pat. No. 5,280,629 is that synchronization is lost very quickly if the GPS signal disappears, e.g. because of atmospheric interference and disturbances.

DISCLOSURE OF THE INVENTION

The present invention addresses the problem of how time stamping clock can be synchronized in a network, preferably an ATM network, with sufficient accuracy and reliability.

Another problem addressed by the invention is how synchronization can be made insensitive to interference in GPS-equipment.

Another problem addressed by the present invention is how to provide a time value switching format that requires a minimum of processor capacity.

Another problem addressed by the present invention is how delays in switching packets in a packet switched network, preferably an ATM network, can be measured with sufficient accuracy and reliability.

Accordingly, an object of the present invention is to synchronize time stamping clocks in different nodes in a network, preferably an ATM network, with sufficient accuracy and reliability.

Another object is to enable packet switching delays in a packet switched network, preferably an ATM network, to be measured with sufficiently high precision and sufficient reliability.

Still another object of the invention is to facilitate processing of time values switched between two nodes in a network.

In accordance with the present invention, these problems associated with the synchronization of time stamping clocks in different nodes in a network are solved in that the clocks are phase-locked to network-synchronization clocks, and in that the time stamping clocks obtain absolute time from a GPS receiver.

The problem of facilitating processing of the time values is also solved in accordance with the present invention, by inserting in the transmission of said time values a format that can be used directly to calculate time differences without translation.

More specifically, the solution includes a GPS receiver that supplies TOD (Time Of Day) and PPS (Pulse Per Second) to a synchronization function. The synchronization function uses TOD to provide an absolute time for the time stamping clock in a node. There is thus obtained a synchronized absolute time between the time stamping clocks in the different nodes with a resolution of one second. The PPS pulse is used to obtain a degree of accuracy of one microsecond between the clocks. The clocks in the different nodes in the network are phase-locked to network synchronization clocks. The network synchronization clocks are clocked in the normal synchronization hierarchy of the physical interface in a telecommunications network. Since all network elements are phase-locked in the network synchronization hierarchy, it is guaranteed that all time stamping clocks will be phase-locked. Any chosen high resolution can be obtained within each second, by determining the frequency of the time stamping clocks. The accuracy of the absolute time is determined by the accuracy of PPS.

Because the time stamping clocks are phase-locked to the network synchronization clocks and not to the GPS, the time stamping clocks will continue to have a high degree of accuracy even if the GPS equipment should malfunction or if the signal from the GPS satellite should be disturbed.

One advantage afforded by the present invention is that synchronization of time stamping clocks is highly accurate and reliable.

Another advantage is that the invention is insensitive to faults in GPS equipment.

Another advantage is that a large quantity of time values can be handled effectively at one and the same time, and that the absolute time can be obtained for transmission and reception.

The invention will now be described in more detail with reference to preferred embodiments thereof and also with reference to the accompanying drawings.

DESCRIPTION OF PREFERRED EMBODIMENTS

Figure 1:
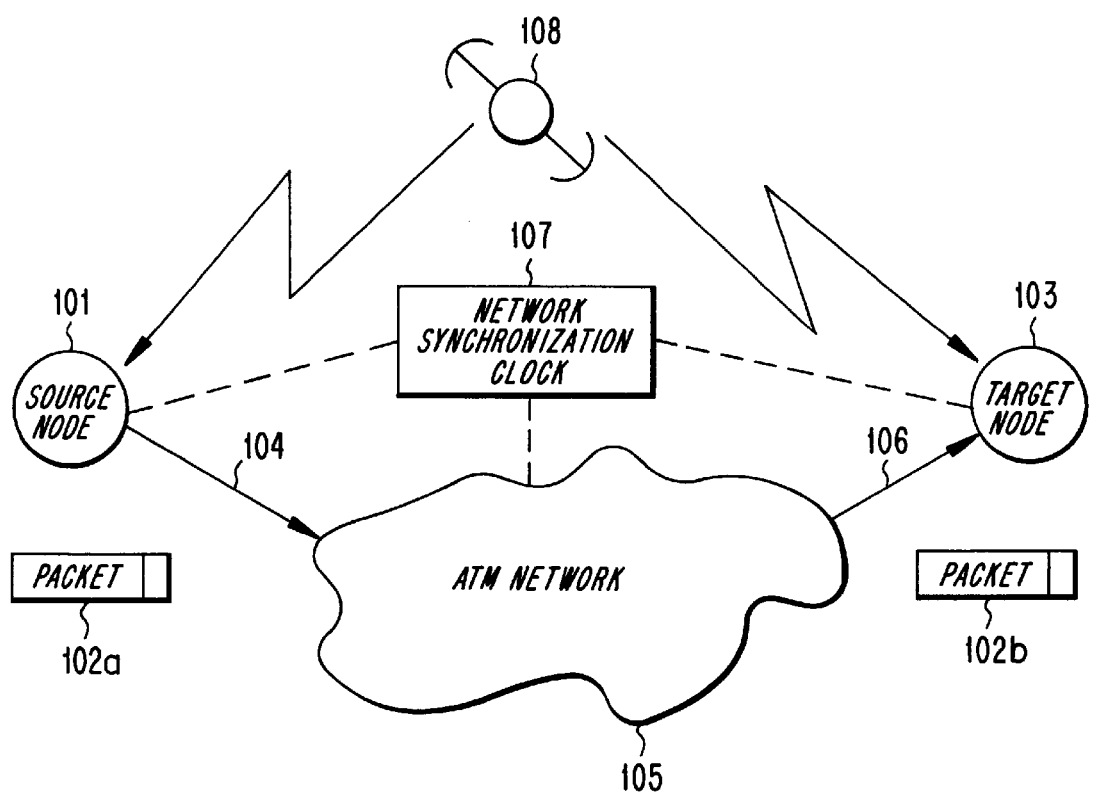
FIG. 1 is an overview of a network according to one embodiment of the invention.

The reference 101 in FIG. 1 identifies a first node in a network. The node 101 is a source node for measuring the delay in sending a packet 102 to a node 103, called the target node. The packet 102 is shown at a first time point in the node 101, and is there referenced 102a. At this time point, the value of the time stamping clock in node 101 is stored in the packet and the packet is sent to a network 105 via the link 104. The network 105 is an ATM network in which the packet 102 passes a number of nodes before arriving at the node 103 at a second time point 102b, via a link 106. The value of the time stamping clock is read in node 103 at the same time as the packet 102 arrives. This value is compared with the value stored in the packet 102, therewith enabling the delay to be calculated. Reference numeral 107 identifies a network synchronization clock in the network synchronization hierarchy.

It will be understood that although it would appear from FIG. 1 that it is the same network synchronization clock 107 that supplies both nodes 101, 103 with pulses, such need not be the case. These pulses may equally as well be delivered by different, mutually phase-locked synchronization clocks that supply pulses to the various nodes in the network.

The time stamping clocks in the nodes 101 and 103 are phase-locked to the network synchronization clock 107. The nodes 101 and 103 also include GPS receivers for receiving a signal containing TOD and PPS from a GPS satellite 108.

In an ATM network, the time value is sent in a PM packet 102 in a field designated TSTP. The TSTP field consists in thirty-two bits and the time value is stored as the thirty-two least significant bits of the number of microseconds that have passed since 00:00:00 Jan. 1, 1972. Since the time value is not coded when stored, the receiving node need only read and subtract in order to calculate time differences, for instance. This facilitates processing when calculating time delays, as distinct from the use of some form of code, such use increasing the calculating load on the processor.

Figure 2:
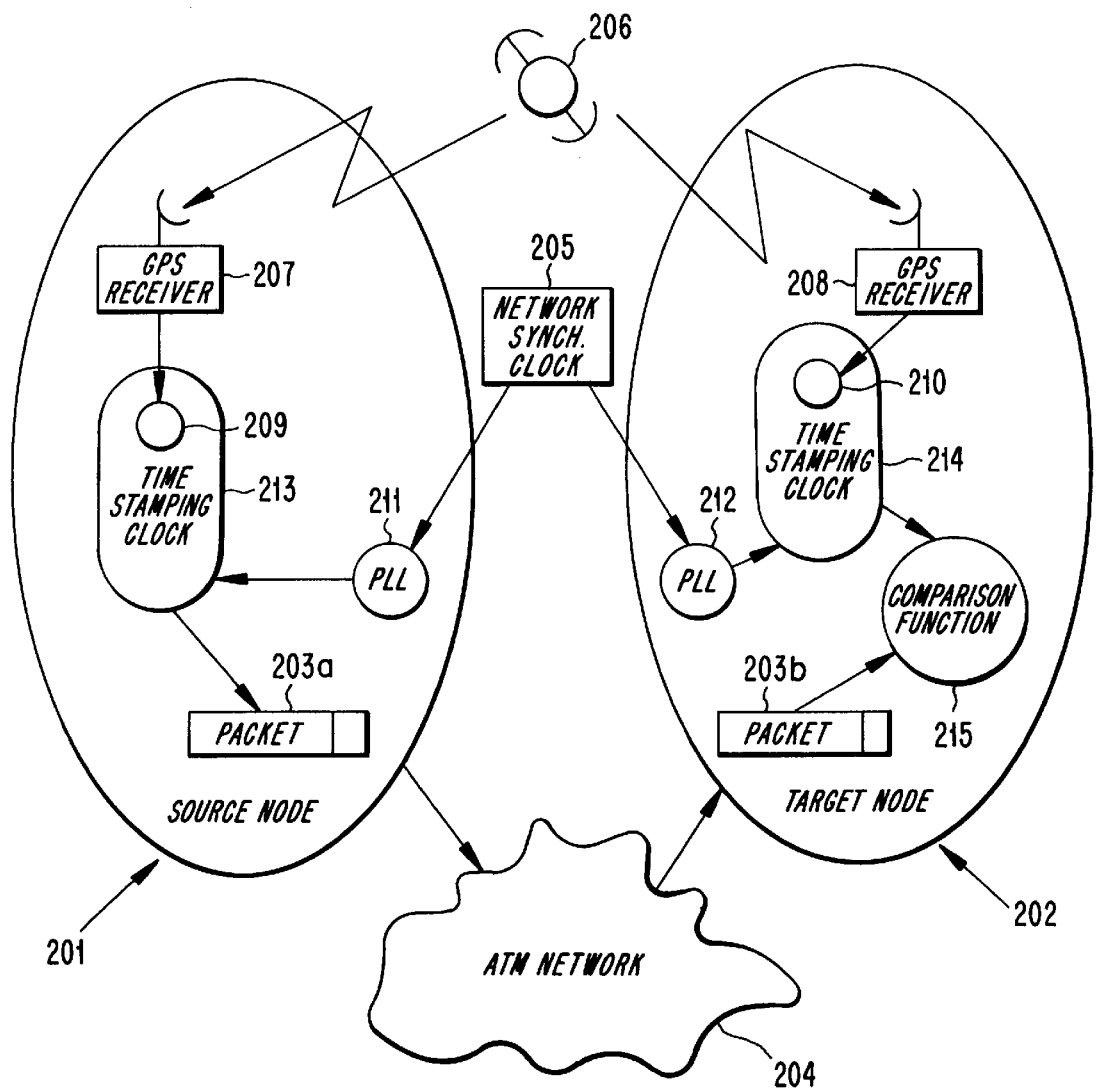
FIG. 2 is a schematic illustration of one embodiment of the invention.
Figure 3:
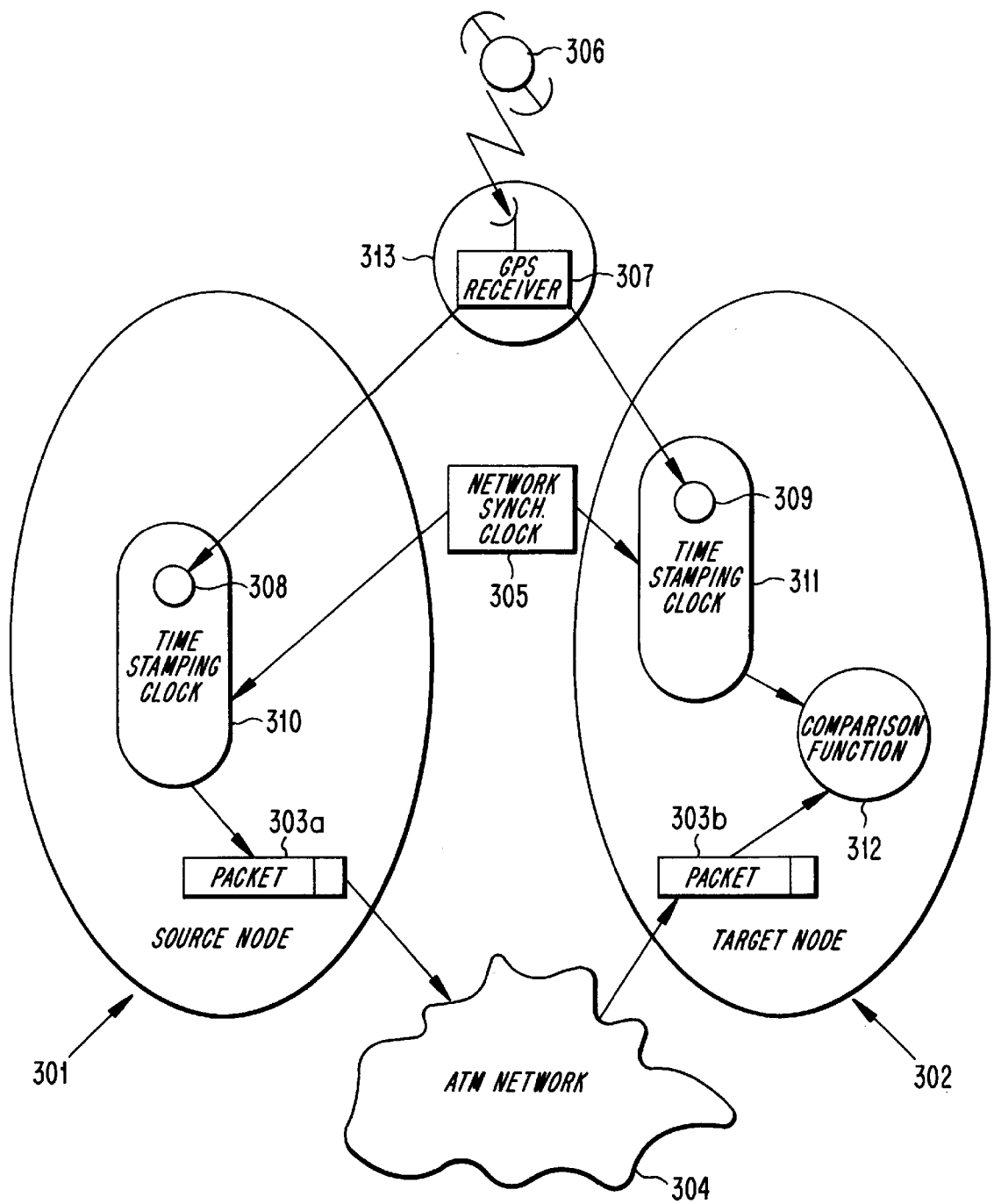
FIG. 3 is a schematic illustration of another embodiment of the invention.

Synchronization of the time stamping clocks will be seen more readily from FIG. 2. A node 201 is a source node in measuring delays between node 201 and a node 202. Node 202 is the target node in the delay measuring process. A packet 203 is switched over an ATM network 204. Numeral 205 identifies a network synchronization clock, while numeral 206 identifies a TPS satellite. Similar to the embodiment illustrated in FIG. 1, the nodes 201 and 202 may be supplied with pulses from two physically different but mutually phase-locked network synchronization clocks in the FIG. 2 embodiment. A comparison between the numbering in FIGS. 1 through 3 is given in the following Table:

|  | FIG. 1 | FIG. 2 | FIG. 3 |
| --- | --- | --- | --- |
| Source node | 101 | 201 | 301 |
| Target node | 103 | 202 | 302 |
| Packet | 102 | 203 | 303 |
| ATM network | 105 | 204 | 304 |
| Network synchronization clock | 107 | 205 | 305 |
| GPS satellite | 108 | 206 | 306 |

The numeral 207 identifies a GPS receiver in node 201. The receiver 207 receives TOD and PPS from a signal sent by the GPS satellite 206. Similarly, a CPS receiver 208 in the node 202 receives TOD and PPS from the same GPS satellite 206. The GPS receiver 207 sends to a synchronization function 209 information relating to TOD and PPS. The function 209 stores the value of TOD in a data store that forms a part of a time stamping clock 213. A synchronization function 210 in node 202 functions in a similar manner with a time stamping clock 214. By storing TOD plus one second precisely when the next PPS is received, there is obtained an absolute time which is identical in all nodes to a degree of accuracy of one microsecond. TOD is obtained from the GPS satellite 206 with a resolution of one second and PPS is obtained with a degree of accuracy of one microsecond or better. A PLL (Phase Locked Loop) 211, 212 in each node 201, 202 is phase-locked to the network synchronization clock 205 in the network synchronization hierarchy. The PLLs 211, 212 deliver a pulse train to the time stamping clocks 213, 214. The time stamping clocks 213, 214 are counted up with each pulse that arrives. When the PLLs 211, 212 have a frequency of 1 Mhz, each upcount corresponds to one microsecond.

The accuracy of the PPS signal depends on a number of different things, inter alia the receiver equipment used and on different types of corrections. It can be said that, as a rule, the lowest degree of accuracy achieved is one microsecond, although much better values can be obtained with refined instruments and positional stipulations.

The time stamping clocks 213, 214 are synchronized relatively seldomly, i.e. when a new TOD value is stored, e.g. between once every ten minutes and once every calendar day. Synchronization can result -in an error if the PLLs 211, 212 do not have precisely the same frequency as a GPS for instance, the PLLs 211, 212 may only have counted 999 microseconds when the next PPS pulse arrives. This results in a gap of one microsecond. This error can be rectified in a number of different ways. For instance, a message can be sent with the next packet intended for delay measurement that indicates that synchronization has been carried out. Another option is to ignore the error, since the effects of a large number of measurements disappear. A third option is to synchronize often enough for the error to be smaller than one microsecond, which will not then influence the measurement.

In the illustrated embodiment, the PPLs 211, 212 have a frequency of 1 Mhz and by keeping it phase-locked to the network synchronization clock 205, it will be guaranteed that all time stamping clocks keep the same time. The PPL 211 delivers a pulse to the time stamping clock 213 every microsecond. The above-described time measurements are combined to obtain a time stamping clock having a resolution and accuracy of one microsecond. The millisecond and microsecond parts of the time value are counted up by the PLL 211 and the absolute time of TOD and PPS is obtained in the synchronization. The PLL 212 functions in a corresponding manner in the node 202.

In another embodiment, the PLLs 211, 212 have a frequency of 10 Mhz. This results in a difference between the absolute resolution and the relative resolution. The absolute resolution will still be one microsecond given by the PPS signal, meaning that the resolution for measuring absolute time delays is still one microsecond. On the other hand, all relative magnitudes can be measured with a resolution of 0.1 microsecond, e.g. delay variations, CDV.

Because the PLLs 211 and 212 are phase-locked to the network synchronization hierarchy, a PPS pulse is not necessary in maintaining the accuracy of the PLLs 211 and 212. Even though the PPS pulse may disappear, the PLLs 211 and 212 will remain synchronized for a very long period of time.

When the packet 203 arrives at the node 202, a comparison function 215 reads the time value from the packet 203 and compares this value with the value of the time stamping clock 214. This enables CDV and CTD to be calculated, for instance.

The embodiment illustrated in FIG. 3 also lacks the use of a PLL, and two time stamping clocks 310, 311 obtain pulses directly from a network synchronization clock 305 in the network synchronization hierarchy. Similar to the embodiments of FIGS. 1 and 2, the various nodes 301, 302 in the FIG. 3 embodiment may also be provided with pulses by two physically different but mutually phase-locked network synchronization clocks. In the FIG. 3 embodiment, a GPS receiver 307 is centralized by being localized in a node 313. The fact that the GPS receiver 307 is able to switch the GPS signal from a satellite 306 to two nodes 301 and 302 without losing the accuracy in the PPS signal enables synchronization to be implemented with sufficient accuracy. This embodiment is analogous with the aforedescribed embodiments in other respects. A synchronization function 308 coordinates TOD, PPS and pulses from the network synchronization clock 305 in the time stamping clock 310, which stores a time value in a packet 303. FIG. 3 shows the packet 303 in a first time point and is there referenced 303a and at a second time point, where it is referenced 303b. The packet 303 is sent to the node 302 via a network 304, and the time value stored in the packet is read in said node. A comparison function 312 compares the value of a time stamping clock 311 localized in the node 302 with the time value obtained from the packet 303. The comparison function 312 is then able to calculate CDT, CDV and other data of interest. A synchronization function 309 coordinates TOD, PPS and pulses in the node 302, in the same way as the node 301.

Figure 4:
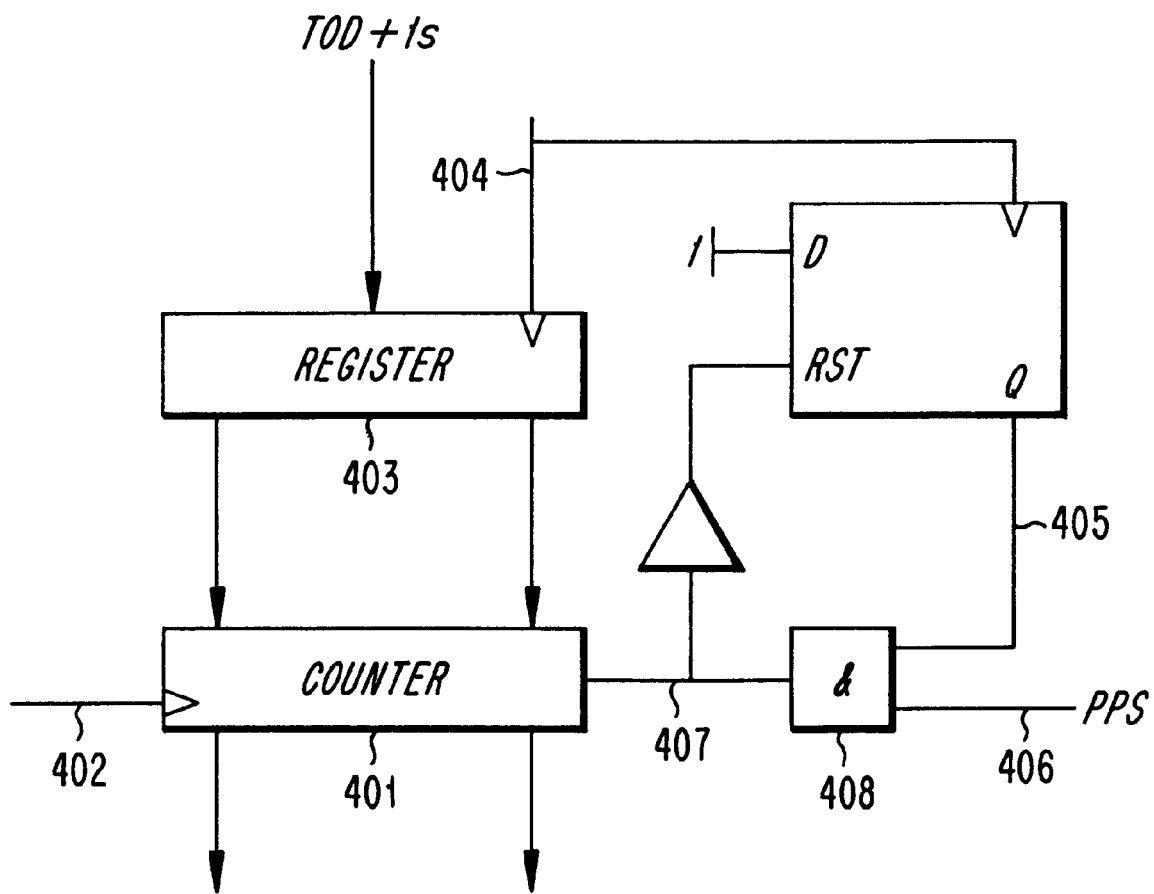
FIG. 4 is a block schematic illustrating synchronization.

FIG. 4 shows in detail combination of TOD, PPS and the signal from the PLL. Numeral 401 identifies a counter which is stepped for each pulse on an input 402. A pulse train arrives on the input 402 from the PLL 211 in FIG. 2, or directly from the network synchronization clock 305 in FIG. 3 in the network synchronization hierarchy. Numeral 403 identifies a register in which TOD information is stored. When TOD arrives from the GPS signal, the value of the obtained TOD with the addition of one second is stored in the register 403. A signal 404 is set to one, which enables a Q-output 405 to be set to one, and when the next PPS pulse arrives on the input 406 both inputs of the AND gate 408 are ones, which gives a one on a latch-input 407 and the value TOD register 403 is written into the counter 401.

It will be understood that the invention is not restricted to the aforedescribed and illustrated embodiments thereof, and that modifications can be made within the scope of the following claims.

What is claimed is:

1. A method of synchronizing at least one time stamping clock with a number of other time stamping clocks in a network, comprising:

sending pulses such that the pulses arrive at said time stamping clock at regular intervals;

sending, by a GPS receiver, PPS information (Pulse Per Second) and TOD information (Time Of Day) to a synchronization function; and coordinating, by said synchronization function, the value of said time stamping clock from PPS, TOD and pulses.

2. A method according to claim 1, wherein a PLL sends pulses to the time stamping clock; and wherein said PLL phase-locks to a network synchronization clock.

3. A method according to claim 1, wherein a network synchronization clock sends pulses directly to said time stamping clock.

4. A method according to claim 2, wherein said PLL sends pulses to said time stamping clock at a frequency of 1 MHz.

5. A method according to claim 2, wherein said PLL sends pulses to said time stamping clock at a frequency of 10 MHz.

6. A method according to claim 1, wherein said synchronization function stores TOD plus one second in a register wherein said synchronization function enables data to be written in a counter subsequent to having stored TOD plus one second in said register; wherein the value of said register is written into said counter upon the arrival of the next PPS; wherein writing of the value of said register into said counter makes register writing impossible; and wherein said counter is stepped with each pulse received.

7. An arrangement for synchronizing at least one time stamping clock in a first node with a number of second time stamping clocks, comprising:

at least one network synchronization clock;

wherein said first node includes means for receiving a GPS signal that contains TOD information and PPS information;

wherein said first node includes pulse receiving means; and wherein said first node includes a synchronizing function for coordinating said pulses with TOD and PPS for calculating the value of said time stamping clock.

8. An arrangement according to claim 7, wherein a PLL is connected to said network synchronization clock; and wherein said PLL is connected to said time stamping clock.

9. An arrangement according to claim 7, wherein said time stamping clock is connected directly to said network synchronization clock.

10. An arrangement according to claim 7, wherein said first node includes a GPS receiver; and wherein said GPS receiver is connected to said synchronization function.

11. An arrangement according to claim 7, wherein a second node includes a GPS receiver; and wherein said GPS receiver is connected to said synchronization function.

12. An arrangement for measuring delays when switching packets in a network, said network including at least two nodes, comprising:

at least one network synchronization clock included in the network;

wherein said nodes include means for receiving TOD and PPS from a GPS signal;

wherein said nodes include pulse receiving means;

wherein said nodes include a synchronization function for coordinating said pulses with TOD and PPS for calculating the value of a time stamping clock localized in each node;

wherein the first node includes means for storing in a packet a time value of said time stamping clock and means for switching said packet over said network to said second node;

wherein said second node includes means for reading the time value in the packet; and wherein said second node includes means for comparing the time value read from the packet with a time value of the time stamping clock in said second node.

13. An arrangement according to claim 12, wherein a PLL is connected to said network synchronization clock; and wherein said PLL is connected to said time stamping clock.

14. An arrangement according to claim 12, wherein said time stamping clock is connected directly to said network synchronization clock.

15. An arrangement according to claim 12, wherein a GPS receiver is located in each node; and wherein said GPS receiver is connected to said synchronization function.

16. An arrangement according to claim 12, wherein a third node includes a GPS receiver; and wherein said GPS receiver is connected to said first node and to said second node.

17. An arrangement according to claim 12, wherein the time value is stored in the packet as the thirty-two least significant bits of the number that represents the number of microseconds that have passed since 00:00:00 Jan. 1, 1972.

* * * * *